US008181566B2

(12) United States Patent
Jejčič

(10) Patent No.: US 8,181,566 B2
(45) Date of Patent: May 22, 2012

(54) MACHINE FOR MAKING HOMEMADE ICE-CREAM AND SIMILAR

(75) Inventor: Valter Jejčič, Nova Gorica (SI)

(73) Assignee: Valmar Global Vse Za Sladoled D.O.O., Dombrava (SI)

( * ) Notice: Subject to any disclaimer, the term of this patent is extended or adjusted under 35 U.S.C. 154(b) by 1446 days.

(21) Appl. No.: 11/708,619

(22) Filed: Feb. 21, 2007

(65) Prior Publication Data
US 2007/0243302 A1    Oct. 18, 2007

(30) Foreign Application Priority Data

Feb. 21, 2006  (IT) .............................. TO2006A0119

(51) Int. Cl.
*A23C 3/04*  (2006.01)
*B65D 51/18*  (2006.01)
*F25D 23/00*  (2006.01)

(52) U.S. Cl. ................... 99/455; 220/254.1; 220/592.13

(58) Field of Classification Search ............. 220/592.13, 220/203.09, 244, 245, 248–250, 252, 314–318, 220/254.1–254.4, 254.8, 255, 256.1, 212.15, 220/323; 62/340; 99/455
See application file for complete search history.

(56) References Cited

U.S. PATENT DOCUMENTS

| | | | | | |
|---|---|---|---|---|---|
| 1,672,433 | A | * | 6/1928 | Stant | 220/254.3 |
| 2,278,899 | A | * | 4/1942 | Schorer | 220/244 |
| 3,084,828 | A | * | 4/1963 | Davies | 220/323 |
| 3,159,095 | A | * | 12/1964 | Wagner | 99/408 |
| 3,179,285 | A | * | 4/1965 | De Frees | 220/89.4 |
| 3,365,096 | A | * | 1/1968 | Muehl | 220/314 |
| 3,400,850 | A | * | 9/1968 | Johannsen | 220/250 |
| 3,930,535 | A | | 1/1976 | Menzel | |

(Continued)

FOREIGN PATENT DOCUMENTS

DE     2706594     8/1977

(Continued)

OTHER PUBLICATIONS

Richardson et al.; "Heat Processing Equipment"; Processing and Packaging of Heat Preserved Foods; 1991; Glasgow, GB; pp. 50-69.

(Continued)

*Primary Examiner* — Bryon Gehman
*Assistant Examiner* — Shawn Braden
(74) *Attorney, Agent, or Firm* — Dickstein Shapiro LLP

(57) ABSTRACT

A machine for making homemade ice-cream and similar having an outer casing, a mixing bowl housed inside the machine and projecting outwards of the casing, and a movable lid hinged to the casing and movable to and from an operating position in which it closes the top end of the bowl completely; the movable lid having a supporting arm which is hinged to the casing and is provided with a through opening positioned over the top end of the bowl when the supporting arm is in a lowered position, and a cover fixed to the supporting arm so as to be positioned closing the top end of the bowl when the supporting arm is in the lowered position; the cover having a cup-shaped body fixed upside down to the supporting arm with the bottom of the cup-shaped body located at the through opening, a threaded tubular sleeve which engages a through hole formed in the bottom of the cup-shaped body so as to project from the supporting arm on back through the through opening, and a lock nut screwed to the end portion of the tubular sleeve to grip the supporting arm between the cup-shaped body and the lock nut.

10 Claims, 4 Drawing Sheets

U.S. PATENT DOCUMENTS

| | | | | |
|---|---|---|---|---|
| 4,096,968 A | * | 6/1978 | Treiber et al. | 220/314 |
| 4,392,361 A | | 7/1983 | Cavalli | |
| 4,501,377 A | * | 2/1985 | Palmer, III | 220/203.09 |
| 4,817,396 A | | 4/1989 | Menzel | |
| 5,967,358 A | * | 10/1999 | Adams et al. | 220/203.09 |
| 5,992,680 A | * | 11/1999 | Smith | 220/812 |
| 6,041,614 A | | 3/2000 | Yamaya et al. | |
| 7,134,385 B1 | * | 11/2006 | Richard et al. | 99/403 |
| 7,802,694 B2 | * | 9/2010 | Lee | 220/582 |

FOREIGN PATENT DOCUMENTS

| | | |
|---|---|---|
| EP | 0063230 | 10/1982 |

OTHER PUBLICATIONS

European Search Report dated Aug. 22, 2008.

* cited by examiner

MACHINE FOR MAKING HOMEMADE ICE-CREAM AND SIMILAR

The present invention relates to a machine for making homemade ice-cream and similar.

More specifically, the present invention relates to a pasteurizer for making homemade ice-cream and similar, and to which the following description refers purely by way of example.

BACKGROUND OF THE INVENTION

As is known, pasteurizers for making ice-cream and similar normally comprise a cylindrical mixing bowl, into which the ingredients for a given amount of ice-cream are poured; a heating unit for heating and maintaining the mixing bowl and contents for a predetermined time at a temperature normally ranging between 60° C. and 100° C.; a mixing member mounted for rotation inside the mixing bowl to blend the ingredients uniformly when preparing the ice-cream mixture; and an electronically controlled drive unit for rotating the mixing member at a predetermined angular speed.

More specifically, in known pasteurizers, the mixing bowl is positioned vertically, with the opening projecting outside the casing of the machine, so that the inside of the bowl is accessible and observable directly from the top; and the pasteurizer is fitted with a movable lid hinged to the casing of the machine and movable manually by the user between a lowered position sealing the opening of the bowl, and a raised position allowing free access to the inside of the bowl.

In known pasteurizers, the movable lid normally comprises a shell made of plastic material, and which, excluding the hinges connecting it to the casing, is molded in one piece to reduce the manufacturing cost of the machine.

Though highly efficient, movable lids of the above type have proved fairly fragile, and, more importantly, relatively awkward to clean in daily use, with all the problems this entails.

In addition, lids of the above type are extremely expensive to repair: in fact, the whole lid must be replaced, even in the event of only minor cracks in the plastic shell.

SUMMARY OF THE INVENTION

It is therefore an object of the present invention to provide a pasteurizer fitted with a movable lid designed to eliminate the aforementioned drawbacks.

According to the present invention, there is provided a machine for making homemade ice-cream and similar, as claimed in the attached Claims.

BRIEF DESCRIPTION OF THE DRAWINGS

A non-limiting embodiment of the present invention will be described by way of example with reference to the accompanying drawings, in which:

FIG. 3 shows an exploded view in perspective, with parts removed for clarity, of a variation of the lid of the FIG. 2 machine for making ice-cream and similar;

DETAILED DESCRIPTION OF THE INVENTION

Figure 1:
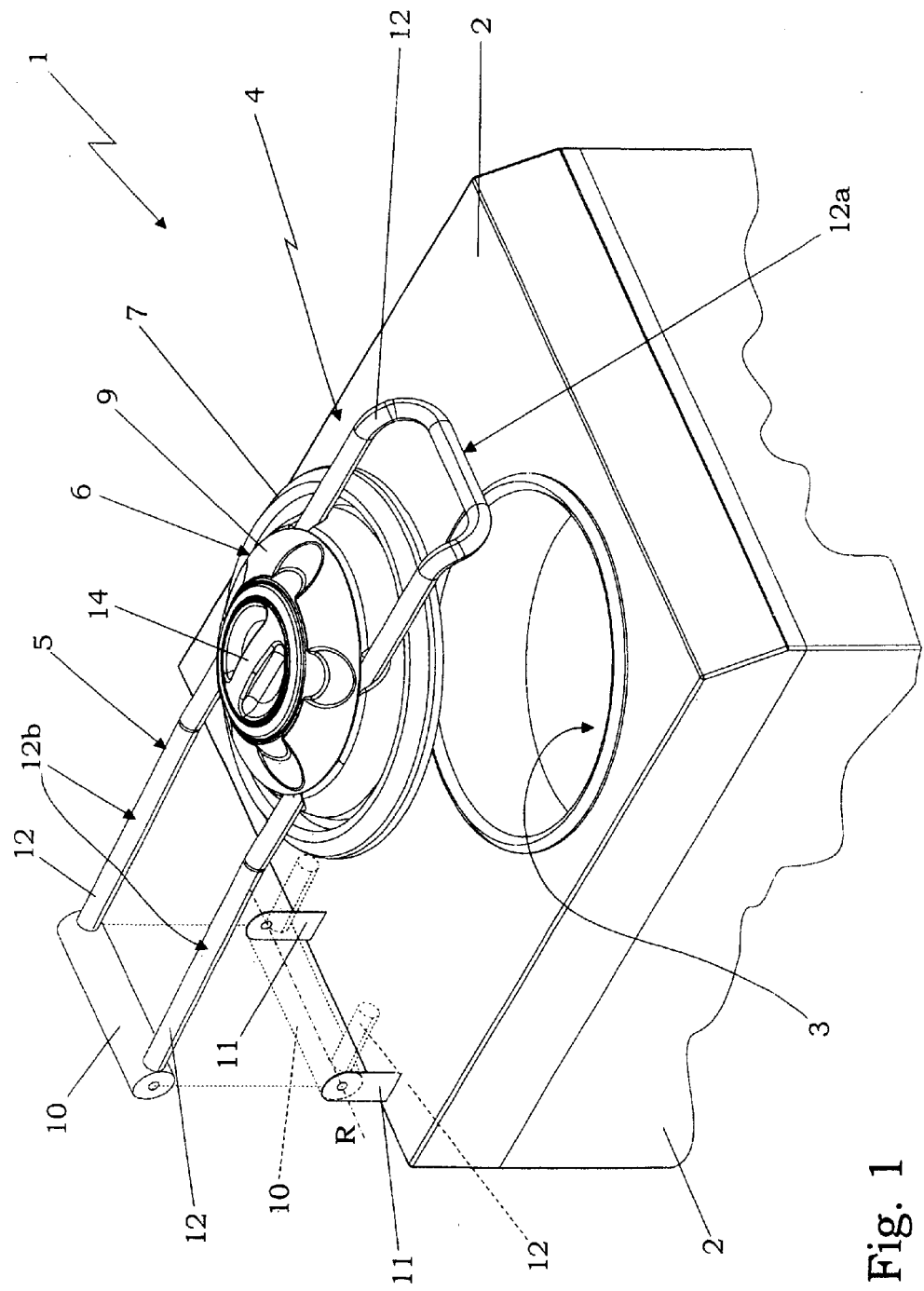
FIG. 1 shows a view in perspective of the top of a machine for making ice-cream and similar, in accordance with the teachings of the present invention.
Figure 2:
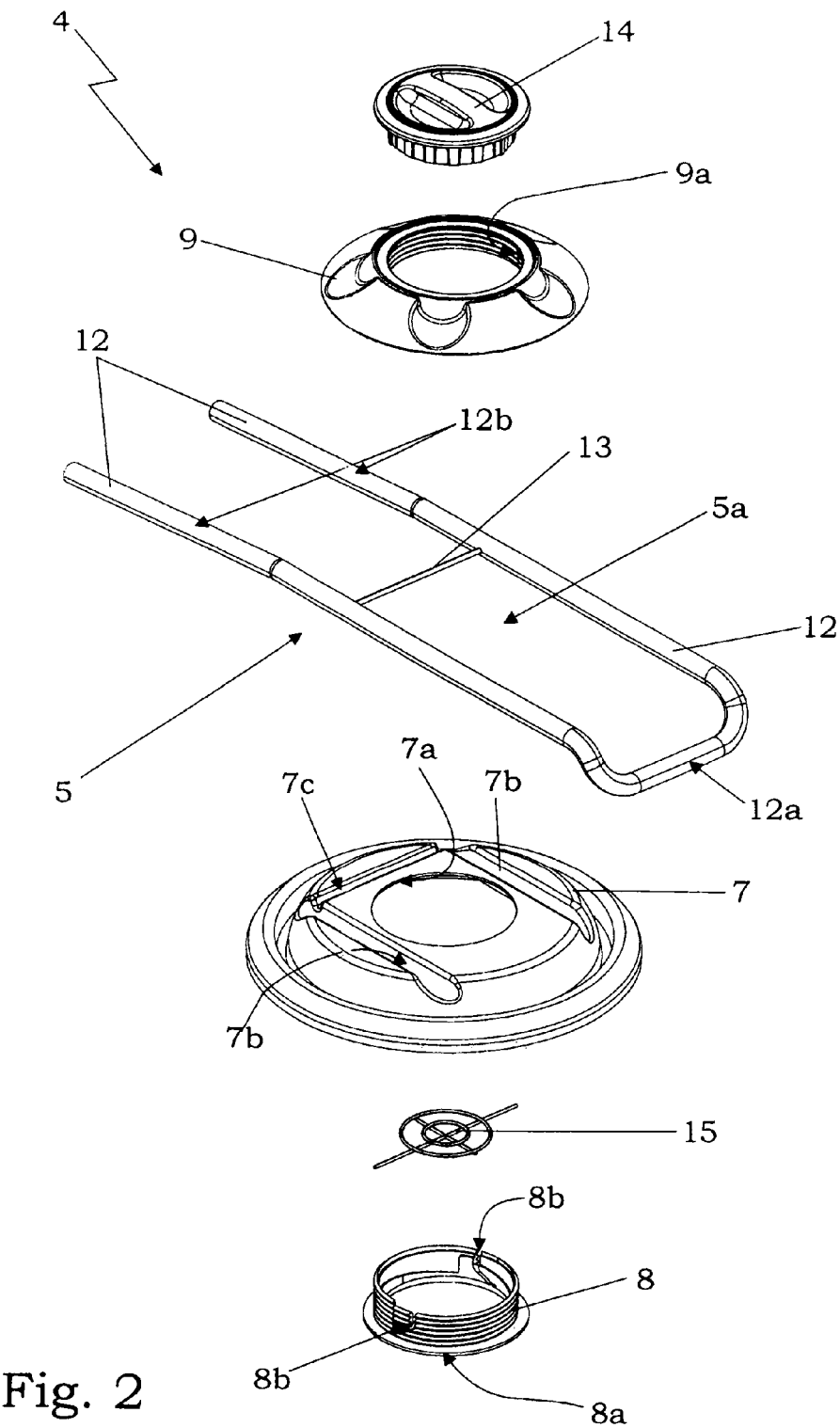
FIG. 2 shows an exploded view in perspective, with parts removed for clarity, of the lid of the FIG. 1 machine.

With reference to FIGS. 1 and 2, number 1 indicates as a whole a machine for making homemade ice-cream and similar, and which substantially comprises a preferably, though not necessarily, parallelepiped-shaped outer box casing 2; and a mixing bowl or tub 3, into which the ingredients for a given amount of ice-cream mixture are poured and then mixed to produce the ice-cream. More specifically, mixing bowl 3 is preferably, though not necessarily, cylindrical, and is positioned vertically inside the machine, with the opening projecting outside casing 2 so the inside of bowl 3 is accessible and observable directly from the top.

With reference to FIG. 1, machine 1 also comprises a movable lid 4 hinged to the top of casing 2 to rotate freely about a horizontal axis of rotation R, and movable manually between a first operating position (FIG. 1), in which movable lid 4 closes the opening of bowl 3 completely, and a second operating position, in which movable lid 4 allows free access to the inside of bowl 3.

Casing 2 and bowl 3 are parts commonly used in the trade, and therefore not described in detail.

As regards movable lid 4, on the other hand, this substantially comprises a supporting arm 5 hinged at one end to casing 2 to rotate freely about axis of rotation R between a lowered position, in which it is positioned substantially horizontally astride the opening of bowl 3 (FIG. 1), and a raised position, in which it is substantially vertical; and a cover 6 shaped to completely close the top end, i.e. the opening, of bowl 3, and which is fixed to arm 5 to close the top end of bowl 3 when arm 5 is in the lowered position.

More specifically, as shown in FIG. 2, arm 5 has a transverse through opening 5a, which is positioned over the opening of bowl 3 when arm 5 is in the lowered position. Cover 6 is fixed to arm 5 at through opening 5a, and comprises a cup-shaped body 7 shaped to fit onto the top end of bowl 3 to close the opening of bowl 3 completely, and which is fixed to arm 5, at through opening 5a, in an upside down position so that the bottom of cup-shaped body 7 rests on a portion of arm 5; an externally threaded tubular sleeve 8, which engages a through hole 7a in the bottom of cup-shaped body 7, and projects from arm 5 on top through through opening 5a; and a lock nut 9 screwed to the end portion of tubular sleeve 8 projecting from arm 5, so as to grip the arm between cup-shaped body 7 and lock nut 9.

More specifically, lock nut 9 is disk-shaped, is coaxial with tubular sleeve 8, is located over cup-shaped body 7, i.e. on the opposite side of arm 5 to cup-shaped body 7, and has a central through hole 9a threaded and sized so that tubular sleeve 8 screws inside it.

With reference to FIGS. 1 and 2, in the example shown, arm 5 is made of metal, and comprises a cylindrical hub 10 coaxial with axis R and fitted, to rotate axially, to the top of machine casing 2 by a central through pin (not shown), which is coaxial with axis R and hinged at both ends to two vertical supporting brackets 11 projecting from the top of casing 2, on opposite sides of hub 10; and a substantially U-shaped bar 12 fixed rigidly at both ends to the body of hub 10 and projecting radially from hub 10.

More specifically, bar 12 is U-shaped and comprises a handle-shaped central portion 12a parallel to and facing hub 10; and two lateral prongs 12b, which are parallel to and face each other, lie in planes perpendicular to axis of rotation R of arm 5, and are each fixed rigidly at one end to the body of hub 10. The gap between the two lateral prongs 12b of bar 12 obviously constitutes through opening 5a of arm 5.

Arm 5 preferably, though not necessarily, also comprises a reinforcing cross member 13 parallel to the longitudinal axis, i.e. axis R, of hub 10 and rigidly connecting the mid-portions of the two lateral prongs 12b of bar 12.

Arm 5 may obviously also be made of plastic material.

With reference to FIG. 2, in the example shown, cup-shaped body 7 is substantially in the form of a spherical bowl, with an outer peripheral edge diameter approximately equal to but no smaller than the nominal diameter of bowl 3, and has a circular central through hole 7a smaller in diameter than the minimum distance between the two lateral prongs 12b of bar 12 at the point at which cover 6 is fixed to arm 5, i.e. at through opening 5a.

In addition, in the example shown, the annular portion of the outer surface of cup-shaped body 7 surrounding through hole 7a is located directly beneath lock nut 9, is substantially flat, and has two straight longitudinal seats 7b extending on opposite sides of through hole 7a and shaped to each house a portion of a respective lateral prong 12b of bar 12. Preferably, though not necessarily, said annular portion of the outer surface of cup-shaped body 7 also has a straight transverse seat 7c, which extends on the surface of the convex face alongside through hole 7a, is locally perpendicular to longitudinal seats 7b, and is shaped to house the whole of reinforcing cross member 13 of arm 5.

With reference to FIG. 2, tubular sleeve 8 is coaxial with through hole 7a of cup-shaped body 7, has an outside diameter approximately equal to but no larger than the diameter of through hole 7a, and has an outer peripheral projection or flange 8a projecting radially from one end of the tubular sleeve, so as to rest on the bottom of cup-shaped body 7, i.e. on the inner surface of cup-shaped body 7 facing inwards of bowl 3 when cup-shaped body 7 is positioned closing bowl 3.

With reference to FIGS. 1 and 2, cover 6 also comprises a plug 14 sized to fit removably inside the end of tubular sleeve 8 projecting from arm 5 on the opposite side to cup-shaped body 7, i.e. the end of tubular sleeve 8 without peripheral flange 8a, so as to completely close the inner conduit of tubular sleeve 8, and a grille 15 fixed in easily removable manner inside tubular sleeve 8 to only allow liquid and semi-solid ingredients through tubular sleeve 8.

In the example shown, grille 15 is defined by a circular grating with an outside diameter approximately equal to but no larger than the inside diameter of tubular sleeve 8, and by a number of radial fastening pins projecting radially from the peripheral edge of the grating and sized to fit inside transverse grooves 8b formed in the wall of tubular sleeve 8.

Grille 15 may be made of metal or plastic, whereas cup-shaped body 7, tubular sleeve 8, lock nut 9, and plug 14 are preferably, though not necessarily, made of plastic.

Operation of machine 1 and movable lid 4 will be clear from the above description and accompanying drawings, with no further explanation required.

The use of movable lid 4 has numerous, obvious advantages: since it is easily dismountable, the movable lid 4 can be thoroughly washed in a short time, thus drastically reducing downtime of the machine.

The design of movable lid 4 is also much more versatile than those of known lids, and can be adapted easily to machines with bowls 3 of different shapes, choosing even very elegant shapes: cup-shaped body 7, in fact, is the only part of movable lid 4 which depends on the type of bowl 3 of the machine, thus affording obvious advantages in terms of lower manufacturing and repair cost.

Movable lid 4 is also much more solid than known lids, with all the advantages this entails.

Clearly, changes may be made to machine 1 and movable lid 4 without, however, departing from the scope of the present invention.

For example, tubular sleeve 8 may be formed in one piece with cup-shaped body 7; in which case, through hole 7a coincides with one end of tubular sleeve 8. Alternatively, tubular sleeve 8 may be designed to click onto cup-shaped body 7.

Figure 3:
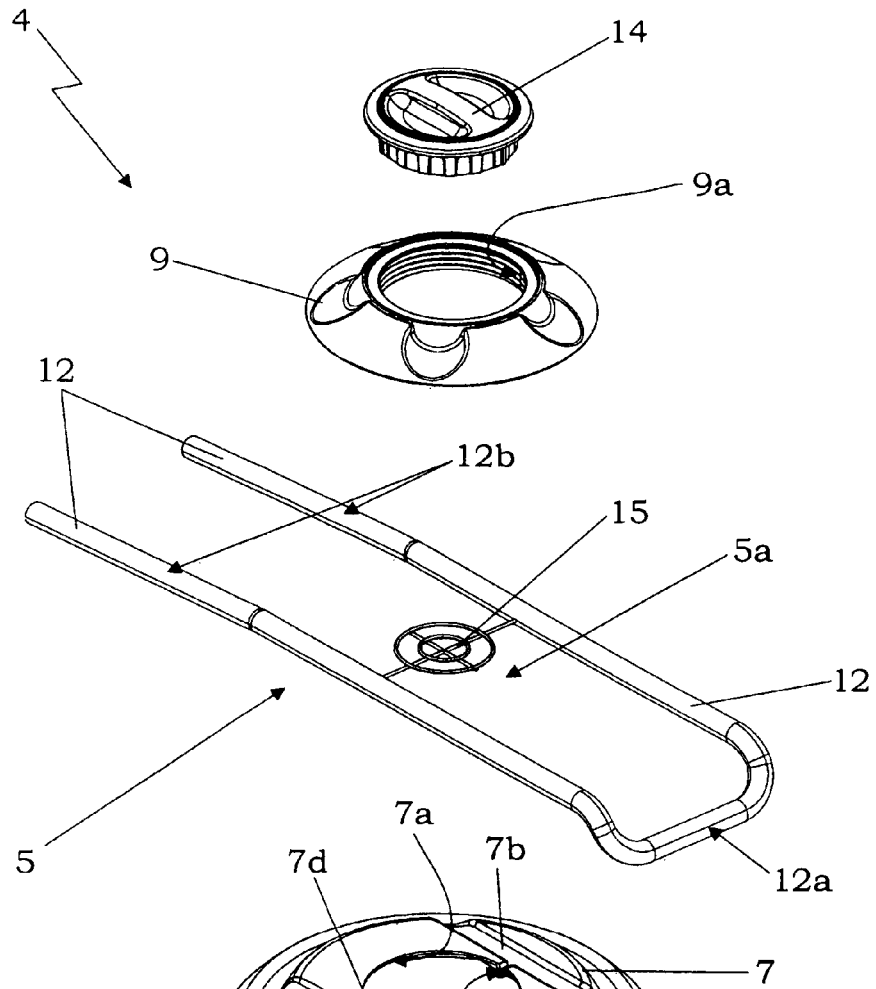

In the FIG. 3 variation, arm 5 has no cross member 13, and the two lateral prongs 12b of bar 12 are connected rigidly to each other by grille 15, which, in this case, is welded to bar 12 so as to be aligned with the conduit of tubular sleeve 8 and, hence, with through hole 7a in the bottom of cup-shaped body 7.

In this variation, the annular portion of the outer surface of cup-shaped body 7 surrounding through hole 7a and located directly beneath lock nut 9 obviously has no transverse seat 7c, and, instead, has a transverse seat 7d extending on the outer surface of cup-shaped body 7, astride through hole 7a, and shaped to house the radial pins of grille 15 connected to the two lateral prongs 12b of bar 12.

In the example shown, transverse seat 7d is a straight seat formed diametrically in cup-shaped body 7, astride through hole 7a, and locally perpendicular to the longitudinal seats 7b housing the two lateral prongs 12b of bar 12.

In this variation, tubular sleeve 8 may be designed to click onto cup-shaped body 7 or grille 15.

Figure 4:
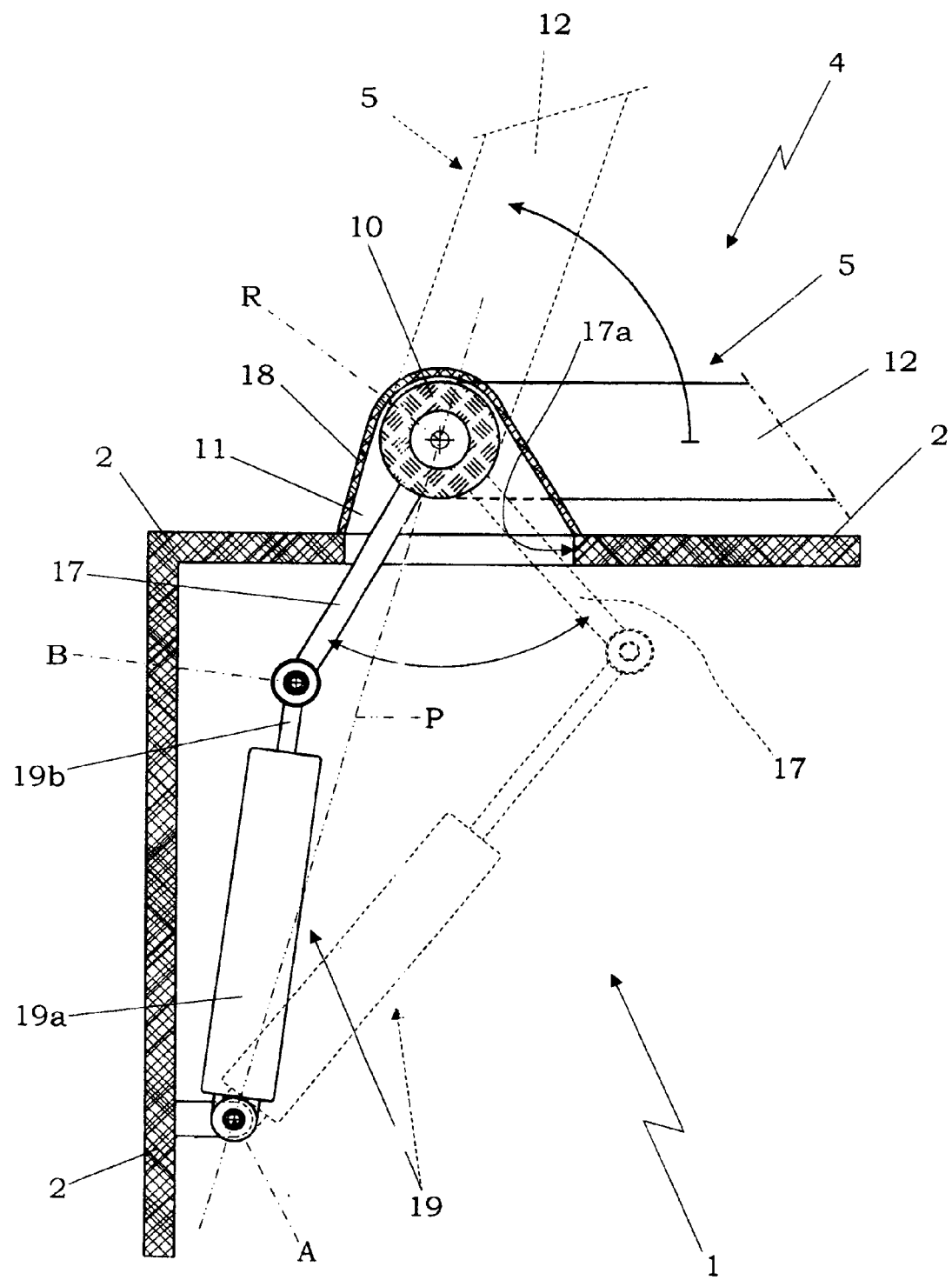
FIG. 4 shows a side view, with parts in section and parts removed for clarity, of a variation of the FIG. 1 machine.

In the FIG. 4 variation, hub 10 of arm 5 is fixed in rotary manner to the two vertical brackets 11 with the axial ends of the hub freely accessible, and has a connecting rod 17 projecting radially from the main body of the hub in a direction perpendicular to axis of rotation R, and which terminates inside casing 2 of machine 1 through a through opening 17a formed in the body of casing 2. Connecting rod 17 is thus able to swing about axis R between two distinct limit angular positions, one corresponding to arm 5 in the lowered position, and the other to arm 5 in the raised position.

In this variation, hub 10 is enclosed inside a protective shell 18 fixed rigidly to the two vertical brackets 11; the two ends of bar 12 are each bayonet connected to a respective axial end of hub 10 to rotate together with hub 10 about axis R; and machine 1 has a known gas spring 19 housed inside casing 2, and which acts on connecting rod 17 of hub 10 to hold arm 5 selectively in the lowered position or the raised position.

More specifically, gas spring 19 is housed inside casing 2 of machine 1 with the bottom of its outer tubular sleeve 19a hinged to casing 2 to rotate freely about an axis A parallel to axis R, and with the end of its movable rod 19b hinged to connecting rod 17 to rotate freely about an axis B parallel to axes A and R.

In addition, gas spring 19 and connecting rod 17 are designed so that, as connecting rod 17 swings about axis R between its two limit angular positions, the end of movable rod 19b moves from one side to another of the plane P containing both axes A and R, so that movable rod 19b of gas spring 19 exerts on connecting rod 17 elastic axial thrust, which in turn torques hub 10 to move arm 5 into, and hold it in, the lowered position or the raised position.

In another variation, not shown, arm 5 may be defined by a single, e.g. rectangular-section, beam made of metal or plastic, hinged in known manner to the top of machine casing 2, and having a circular transverse through hole sized to permit engagement by tubular sleeve 8.

The invention claimed is:

1. A machine (1) for making homemade ice-cream comprising an outer casing (2), a mixing bowl (3) housed inside the machine and projecting outwards of the casing (2), and a movable lid (4) hinged to the casing (2) of the machine and movable to and from an operating position in which it closes an end of said bowl (3) completely; said machine (1) for making homemade ice-cream being characterized in that the movable lid (4) comprises a supporting arm (5) hinged to the casing (2) to rotate about a predetermined axis of rotation (R) to and from a lowered position in which it is positioned astride the end of the bowl (3), and a cover (6) shaped to completely close the end of said bowl (3), and fixed to the supporting arm (5) so as to close the end of the bowl (3) when the supporting arm (5) is in the lowered position; the supporting arm (5) having a through opening (5a) which is positioned over the end of said bowl (3) when the supporting arm (5) is in the lowered position; and said cover (6) comprising a cup-shaped body (7), which is fixed upside down to the supporting arm (5) with a bottom of the cup-shaped body located at said through opening (5a), and is shaped to fit onto the end of said bowl (3) to close the bowl completely, a threaded tubular sleeve (8) which projects from the bottom of said cup-shaped body (7) at a through hole (7a) formed in the bottom of said cup-shaped body (7) and engages said through opening (5a) so as to project from said supporting arm (5), and a lock nut (9) screwed to an end portion of said tubular sleeve (8) to grip said supporting arm between the cup-shaped body (7) and the lock nut (9).

2. A machine for making homemade ice-cream, as claimed in claim 1, characterized in that said cover (6) also comprises a plug (14) sized to fit removably inside the end portion of the tubular sleeve (8) projecting from the supporting arm (5) on the opposite side to said cup-shaped body (7).

3. A machine for making homemade ice-cream, as claimed in claim 1, characterized in that said tubular sleeve (8) fits through the through hole (7a) formed in said cup-shaped body (7), and has an outer peripheral flange (8a) projecting radially from one of its two ends, and which rests on the inner surface of the cup-shaped body (7).

4. A machine for making homemade ice-cream, as claimed in claim 1, characterized in that said supporting arm (5) comprises a substantially U-shaped bar (12) having a central portion (12a) extending parallel to said axis of rotation (R), and two lateral prongs (12b) which are parallel to and face each other, lie in planes perpendicular to said axis of rotation (R) of the supporting arm (5), and are both hinged at the end to said casing (2); the gap between said two lateral prongs (12b) defining the through opening (5a) of said supporting arm (5).

5. A machine for making homemade ice-cream, as claimed in claim 4, characterized in that said supporting arm (5) also comprises a hub (10) extending coaxially with said axis of rotation (R) and fitted to said casing (2) to rotate axially about said axis of rotation (R); said hub (10) having a connecting rod (17) projecting from the main body of the hub in a direction substantially perpendicular to said axis of rotation (R); and said machine (1) having a gas spring (19), which acts on said connecting rod (17) to hold the supporting arm (5) in at least said lowered position.

6. A machine for making homemade ice-cream, as claimed in claim 5, characterized in that said connecting rod (17) extends inside said casing (2) through a through opening (17a) formed in the body of the casing (2); and said gas spring (19) is housed inside said casing (2).

7. A machine for making homemade ice-cream, as claimed in claim 1, characterized in that said cover (6) also comprises a grille (15) housed inside said tubular sleeve (8).

8. A machine for making homemade ice-cream, as claimed in claim 7, characterized in that said grille (15) is fixed removably to said tubular sleeve (8).

9. A machine for making homemade ice-cream, as claimed in claim 8, characterized in that said grille (15) is fixed permanently to said supporting arm (5).

10. A machine for making homemade ice-cream, as claimed in claim 9, characterized in that said grille (15) connects the two lateral prongs (12b) of said substantially U-shaped bar (12) rigidly to each other.

* * * * *